United States Patent
Kumar et al.

(10) Patent No.: US 10,103,873 B2
(45) Date of Patent: Oct. 16, 2018

(54) POWER SIDE-CHANNEL ATTACK RESISTANT ADVANCED ENCRYPTION STANDARD ACCELERATOR PROCESSOR

(71) Applicant: Intel Corporation, Santa Clara, CA (US)

(72) Inventors: Raghavan Kumar, Hillsboro, OR (US); Sanu K. Mathew, Hillsboro, OR (US); Sudhir K. Satpathy, Hillsboro, OR (US); Vikram B. Suresh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 15/088,823

(22) Filed: Apr. 1, 2016

(65) Prior Publication Data

US 2017/0288855 A1  Oct. 5, 2017

(51) Int. Cl.
| | |
|---|---|
| *G06F 11/30* | (2006.01) |
| *H04L 9/00* | (2006.01) |
| *H04L 9/06* | (2006.01) |
| *G06F 12/14* | (2006.01) |

(52) U.S. Cl.
CPC .......... *H04L 9/003* (2013.01); *H04L 9/0631* (2013.01); *H04L 9/0637* (2013.01); *H04L 9/0662* (2013.01); *H04L 2209/046* (2013.01); *H04L 2209/125* (2013.01); *H04L 2209/24* (2013.01)

(58) Field of Classification Search
CPC ................................ G06F 21/72; G06F 21/10
USPC ........................................................ 713/189
See application file for complete search history.

(56) References Cited

U.S. PATENT DOCUMENTS

| | | | |
|---|---|---|---|
| 2001/0044886 A1* | 11/2001 | Cassagnol | G06F 21/6245 711/163 |
| 2002/0061107 A1* | 5/2002 | Tham | G06F 7/722 380/259 |
| 2003/0223580 A1 | 12/2003 | Snell | |
| 2005/0207571 A1* | 9/2005 | Ahn | H04L 9/003 380/28 |
| 2010/0332574 A1 | 12/2010 | Herbert et al. | |
| 2013/0028412 A1 | 1/2013 | Coron | |
| 2014/0229741 A1 | 8/2014 | Mathew et al. | |

(Continued)

OTHER PUBLICATIONS

D. Canright and L. Batina., "A Very Compact Perfectly Masked S-Box for AES," Applied Cryptography and Network Security, pp. 446-459, 2008.

(Continued)

*Primary Examiner* — Evans Desrosiers
(74) *Attorney, Agent, or Firm* — Lowenstein Sandler LLP

(57) ABSTRACT

A processing system includes a processing core and a hardware accelerator communicatively coupled to the processing core. The hardware accelerator includes a random number generator to generate a byte order indicator. The hardware accelerator also includes a first switching module communicatively coupled to the random value indicator generator. The switching module receives an byte sequence in an encryption round of the cryptographic operation and feeds a portion of the input byte sequence to one of a first substitute box (S-box) module or a second S-box module in view of a byte order indicator value generated by the random number generator.

23 Claims, 16 Drawing Sheets

(56) References Cited

U.S. PATENT DOCUMENTS

2015/0172043 A1    6/2015  Li et al.

OTHER PUBLICATIONS

PCT Notification of Transmittal of The International Search Report and The Written Opinion of The International Searching Authority for PCT Application No. PCT/US2017/020497, dated Jun. 7, 2017, 12 pages.

* cited by examiner

314

314

POWER SIDE-CHANNEL ATTACK RESISTANT ADVANCED ENCRYPTION STANDARD ACCELERATOR PROCESSOR

TECHNICAL FIELD

The embodiments of the disclosure relate generally to a computing device, and, more specifically, power side-channel attack resistant advanced encryption standard (AES) accelerator processor for performing cryptography in processors with tolerance to power side-channel attacks.

BACKGROUND

Cryptographic methods may be used to protect confidential information in computer systems and other electronic devices. For example, an encryption operation may be performed, in which a series of transformations as specified by a chosen cryptographic algorithm are performed on a plaintext input data (e.g., a sequence of bits representing text, numbers, intelligible characters, etc.) using an encryption key (e.g., a sequence of bits) to produce encrypted data (cipher text). It is generally practically infeasible to determine the unencrypted plaintext data from the encrypted data, without knowing the cryptographic key. If the cryptographic key is known, a decryption (sometimes referred to as inverse cipher) operation may be performed on the encrypted data to reproduce the corresponding plaintext (unencrypted data). Side-channel attacks (SCA) on cryptographic hardware have gained significant attention, exposing a potential weak-link in platform security. Such attacks allow malicious users to steal embedded secrets by observing leaky physical information such as current signature, electromagnetic (EM) radiation and timing data while the device is under regular operation.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
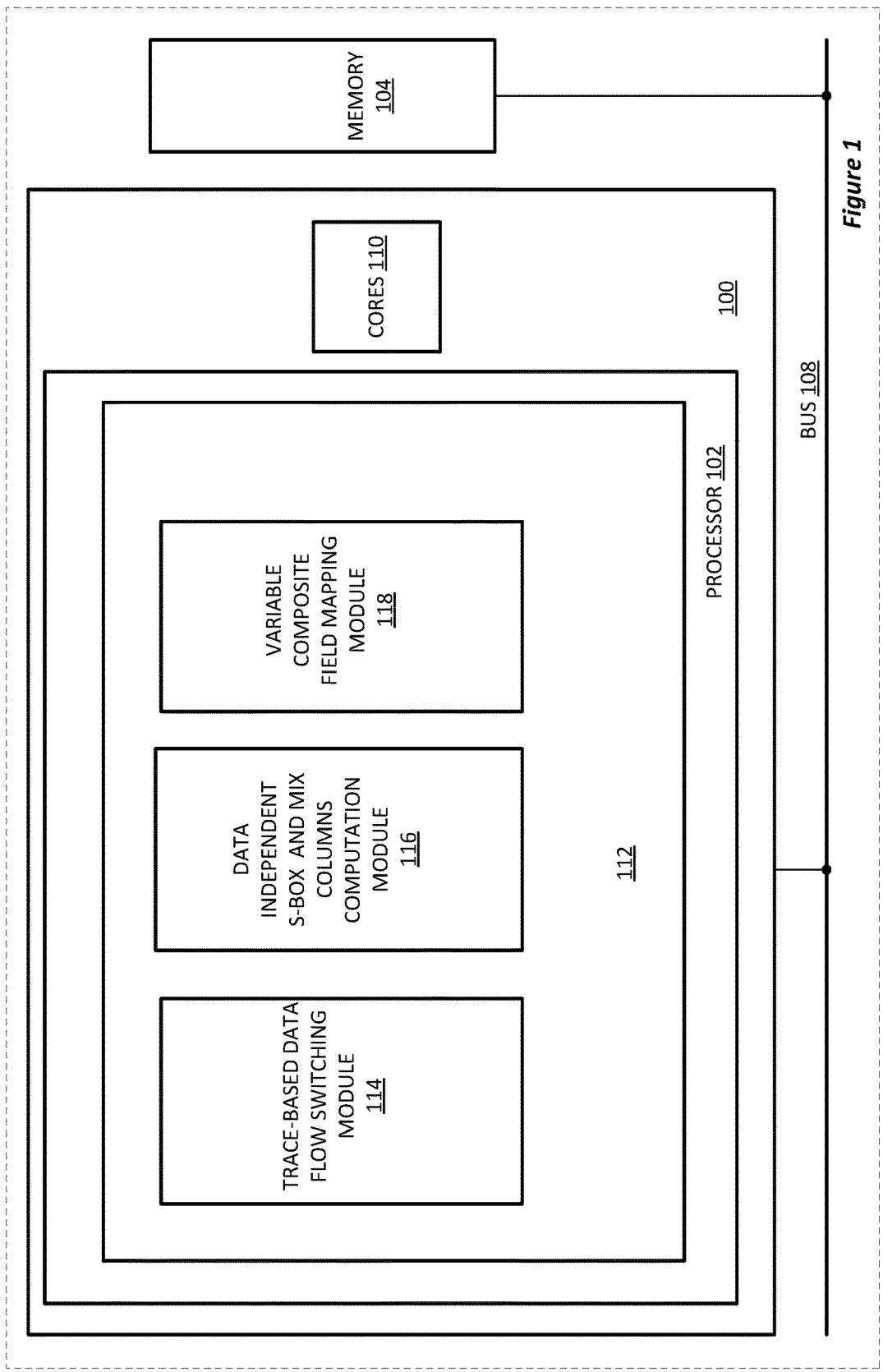
FIG. 1 illustrates a system-on-a-chip (SoC) including a processing system to perform cryptography with tolerance to power SCAs according to an embodiment of the present disclosure.

Disclosed herein are embodiments for providing an instruction set architecture environment for performing cryptography in processors with tolerance to power side-channel attacks.

Conventional techniques to mitigate data-dependent power consumption leakage include random masking and dual-rail logic. Random masking includes mixing random mask with data such that the correlations between the data and the power consumption are randomized. At the end of the computation cycle, the random mask is extracted out to obtain the original ciphertext (plaintext) during encryption (decryption). Dual-rail logic involves both true and complementary versions of every signal to be computed in the hardware. Accordingly, such conventional techniques consume a significant amount of energy and require a large amount of area on the hardware.

Embodiments of the present disclosure overcome the above problems by implementing a mechanism for performing cryptography in processors with tolerance to power SCAs by employing multiple heterogeneous Galois-field arithmetic based S-box operations in the advanced encryption standard (AES) hardware accelerator. Each of the multiple heterogeneous Galois-field S-Box operations is designed to use distinct Galois-field arithmetic to disrupt correlation between data switching activity and corresponding current signature, which results in multiple power consumption profiles for identical input data. Correlation between input data and supply current signatures is disrupted by randomizing byte dataflow within the AES accelerator in every cycle, which results in reduction in correlation between the data and the current drawn from power supply. Further, an on-chip random number generator is used to permute the order in which data bytes are processed by the multiple S-box operations and is periodically reseeded with bytes from an intermediate cipher text to reduce the predictability of the random order. This eliminates the need for on-chip storage, thus reducing the amount of area required in the hardware. The accelerator utilizes the unused S-box and mix columns module to perform data-independent computations during the last round of AES computation, which involves only the key addition operation in order to mask the correlation between data and current signatures. Thus, the power SCA resistant AES accelerator of the present disclosure provides a reduction in correlation between data and current signatures and the area required for hardware resulting in a minimized performance overhead.

A cryptographic method, such as the Advanced Encryption Standard (AES) or SMS4, may perform several iterations (also referred to as "rounds") to transform, using an encryption key, a plaintext data into an encrypted cipher text. Each round may comprise a sequence of arithmetic, logical, or byte permutations operations performed on an input state using a round key, which is derived from the encryption key. The resulting state of each but the last round may then be utilized as the input state of the subsequent round.

At each round of a cryptographic operation, certain or all bits of the round key may be mixed/added with a subset or all of the round state bits, and the result may be fed into a substitution module commonly referred to as an S-box. A substitution box (S-box) substitutes a small block of input bits with another block of output bits. At each round, the round key (obtained from the key with some simple operations, for instance, using S-boxes) is mixed with the round state using some group operation, typically XOR. The output of the S-box may go through several operations to create an intermediate output that would repeatedly go through round iterations. Following the final round, the resulting round state bytes may be used to generate the final cipher output. Decryption is done by simply reversing the process (using the inverse of the S-boxes) and applying the round keys in reverse order.

FIG. 1 illustrates a system-on-a-chip (SoC) 100 including a processing system according to an embodiment of the present disclosure. The SoC 100 may include a processor (such as a central processing unit (CPU)) 102 and a memory that are connected to each other via a bus system 108. The processor 102 may execute tasks such as system applications and user applications using the memory 104 to store the instructions of the programs and data associated with the programs.

In one embodiment, the processor 102 may also include one or more processing cores 110 and a power SCA-resistant AES hardware accelerator unit 112 communicatively coupled to the processing core 110. The power SCA resistant AES hardware accelerator unit 112 functions to provide tolerance to power side-channel attacks. More specifically, the power SCA resistant AES hardware accelerator unit 112 functions to disrupt correlation between data switching/processing within itself and corresponding current signature.

In one embodiment, the power SCA resistant AES hardware accelerator unit 112 includes a trace-based dataflow switching module 114. The trace-based dataflow switching module 114 masks data power dependency by switching S-box processing order of sequential data bytes randomly during every cycle in the first ten rounds of AES cryptographic computation.

In one embodiment, the power SCA resistant AES hardware accelerator unit 112 includes data-independent substitute-box (S-box) and mix columns computation module 116. The substitution box (S-box) computation module 116 substitutes a block of input bits with another block of output bits. The last round of AES computation involves mixing of round key bits with the round state bits, which produces the cipher text. The data-independent S-box and mix columns computation module 116 masks data power dependency by utilizing the unused S-box and Mix Column blocks to perform completely uncorrelated operations to mask power consumption signatures of round key addition during the last round of AES cryptographic computation.

In one embodiment, the power SCA resistant AES hardware accelerator unit 112 includes a variable composite-field mapping module 118. The variable composite-field mapping module 118 masks data power dependency by inserting multiple heterogeneous Galois-field arithmetic based S-box modules and suitable cross-field mapping into trace-based switching data path to further minimize correlation between data and power leakage in a cryptographic computation.

Figure 2:
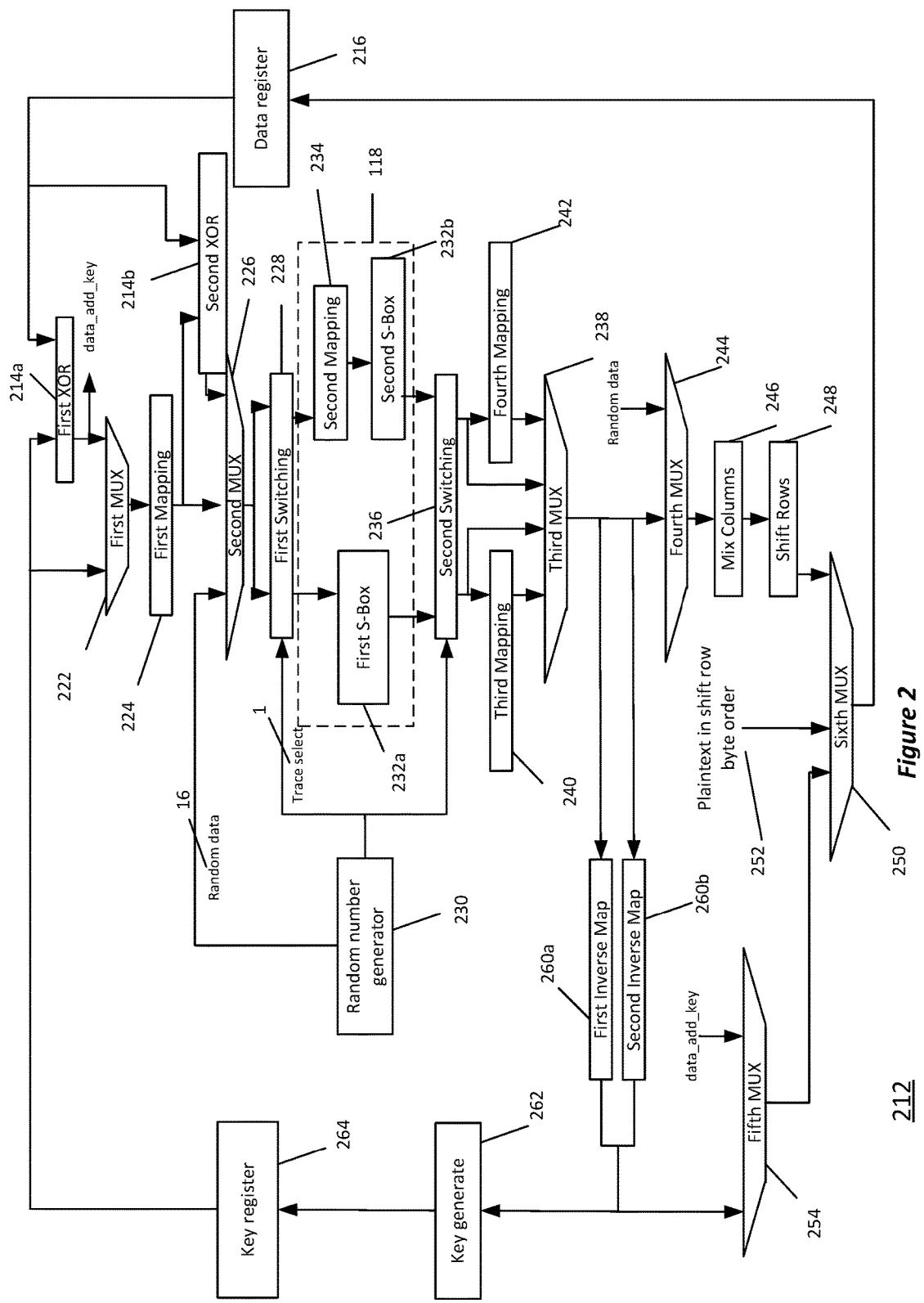
FIG. 2 illustrates a circuit diagram of the power SCA resistant advanced encryption standard hardware accelerator in the processing system of FIG. 1 according to an embodiment of the present disclosure.

FIG. 2 illustrates a detailed circuit diagram of a power SCA resistant AES hardware accelerator unit 212 in accordance with an embodiment of the present disclosure. The power SCA resistant AES hardware accelerator unit 212 is same as the power SCA resistant AES hardware accelerator unit 112 of FIG. 1. As discussed above, the power SCA resistant AES hardware accelerator unit 212 functions to allow tolerance to power side-channel attacks. More specifically, the power SCA resistant AES hardware accelerator unit 212 functions to disrupt correlation between data switching/processing within itself and corresponding current signature. Also, as described above, the power SCA resistant AES hardware accelerator unit 212 functions to perform trace-based data flow switching which masks data power dependency by randomly switching the order of data bytes processed by the S-box during every cycle in the first ten rounds of cryptographic computation. Also, as noted above, the power SCA resistant AES hardware accelerator unit 212 functions to perform data-independent S-box and mix columns computation, which masks data power dependency by utilizing S-box operation and MixColumn operations to perform completely uncorrelated operations to mask power consumption of round key addition during the last (eleventh) round of cryptographic computation, as described in more details herein above. Also, as illustrated above, the power SCA resistant AES hardware accelerator unit 212 incorporates multiple heterogeneous Galois-field arithmetic based S-box modules and corresponding composite-field mapping modules in the variable composite-field mapping module 118, which results in multiple power consumption signatures for identical data for further minimizing the data power correlation. Although, FIG. 2 illustrates cryptographic computation in the encryption mode, similar circuitry can be utilized in the decryption mode by simply reversing the process (using the inverse of the S-boxes) and applying the round keys in inverse order.

The power SCA resistant AES hardware accelerator unit 212 includes a data register 216 including 128 bits of data and a key register 264 including 128 bits of key. In one embodiment, in every cycle, 2 bytes, i.e. 16 bits, of data is retrieved from the data register 216 and 2 bytes, i.e. 16 bits, of key is retrieved from the key register 264. In one embodiment, in all eleven rounds, both the 2 bytes of data from the data register 216 and the 2 bytes of key from the key register 264 are added by a first XOR operation 214a, the output of which is sent to the first multiplexer 222. The output of first XOR 214a is used during the first and last rounds of AES computation. Also, in the all eleven rounds, another input to the first multiplexer 222 is the 2 byte key from the key register 264. The output of the first multiplexer 222 is mapped using a first mapping operation 224. In one embodiment, a mapping operation is performed using a mapping matrix for transforming the standard AES field $GF(2^8)$ to a composite-field $GF(2^4)^2$, and vice versa. The power SCA resistant AES hardware accelerator unit 212 maps the output of first XOR operation 214a during the first round of AES computation to a composite-field $GF(2^4)^2$ using the first mapping operation 224 so that the remaining operations occur in the composite-field. During the other rounds of AES computation, the first mapping operation 224 is used to map the 2 bytes of key from key register unit 264 to the composite-field $GF(2^4)^2$. In one embodiment, in all eleven rounds, the 2 bytes of data from the data register 216 is an input to a second XOR operation 214b. Also, in all eleven rounds, another input to the second XOR operation 214b is the output of first mapping operation 224. The output of second XOR operation 214b is the 2 bytes of data from data register unit 216 added with the 2 bytes of key in composite-field $GF(2^4)^2$.

In one embodiment, the output of the first mapping operation 224 is fed to a second multiplexer 226. Also, in one embodiment, the output of the second XOR operation 214b is fed to the second multiplexer 226. Also, in one embodiment, the output of random number generator unit 230 is fed to the second multiplexer 226. At the beginning of every computation round, the random number generator unit 230 is reseeded with intermediate round output bytes stored in data register 216. Accordingly, in the first ten rounds of AES operation, the output of the second multiplexer 226 is the output of second XOR unit 214b. In the last round of AES operation, the output of the second multiplexer 226 is the output of the random number generator unit 230. During the key generation rounds, the output of the second multiplexer 226 is the output of the first mapping operation 224, which corresponds to the 2 bytes of key mapped into composite-field $GF(2^4)^2$ used for generating round key bits for the subsequent round of AES computation. The 2 bytes of output data from second multiplexer operation 226 are fed as inputs to the first switching operation 228. In one embodiment, the random number generator 230 generates a binary trace select signal, such as a byte order indicator value, which may have values of 0 or 1, and is fed as the control input to the first switching operation 228. In one example, the random number generator 230 is a linear feedback shift register (LFSR).

As shown in FIG. 2, the power SCA resistant AES hardware accelerator unit 212 also includes at least two S-box operations, a first S-box operation 232a and a second S-box operation 232b. The input and output of a S-box operation are elements in a composite-field $GF(2^4)^2$, which may be viewed as a set of 256 8-bit integers with certain operations defined on those integers. The composite-field $GF(2^4)^2$ may be defined by one or more irreducible field polynomials. In common implementations, the S-box may be implemented by performing certain multiplication, addition, and inversion operations on the S-box inputs. The power consumption signatures for data in an S-box depend on the polynomials that define the Galois-field of the S-box unit, including a ground-field polynomial and a composite-field polynomial.

In conventional AES hardware accelerators, all the data bytes are processed by identically designed S-box operations, which create a strong correlation between data switching activity and the corresponding current signature resulting in a fixed relationship between data bytes and power signatures. The power SCA resistant AES hardware accelerator unit 212 employs multiple heterogeneous composite Galois-field S-box operations, each designed using a distinct composite-field arithmetic resulting in multiple power consumption profiles for the same input data. The arithmetic in a composite-field such as the $GF(2^4)^2$ is governed by the choice of these pair of polynomials. The extension/composite-field is an irreducible polynomial of the form $x^2+\alpha x+\beta$ with $\alpha, \beta=0x\{0 \ldots F\}$ and impacts the mapping matrices and the structure of the S-box operation. The ground-field polynomial is an irreducible polynomial of the form $x^4+a_3x^3+a_2x^2+a_1x+a_0$ with $\{a_3\ a_2\ a_1\ a_0\}=0x\{0 \ldots F\}$ and impacts all the $GF(2^4)$ operations within the S-box.

Such multiple composite-field based S-box operations may have significantly different power profiles for the same input data of 256 8-bit integers. The composite-field polynomial is an irreducible polynomial of degree 2 that impacts the mapping-matrices and the structure of the S-box operation. The ground field polynomial is an irreducible polynomial of degree 4 that impacts all of the $GF(2^4)$ operations within the S-box operation. In one embodiment, the polynomial pairs are selected such that a subset of the composite-field S-boxes exhibits significantly lower power consumption profiles when compared to other S-boxes in the multiple composite-field S-boxes module.

In one embodiment, the first S-box operation 232a is performed in the first $GF(2^4)^2$ field defined by the first ground and composite-field polynomials, which may be selected among a plurality of field polynomial pairs. In one embodiment, the second S-box operation 232b is performed in a second $GF(2^4)^2$ by the second ground and composite-field polynomials, which may be selected among a plurality of field polynomial pairs. Each of the plurality of field polynomial pairs defines a corresponding power consumption profile of the data in the S-box operation. Accordingly, each of the first and the second S-box operations 232a and 232b respectively is designed to use a distinct ground and composite-field polynomial pairs resulting in multiple S-boxes yielding combined power consumption profiles, which could not be easily correlated to the input and/or the output data.

The power SCA resistant AES hardware accelerator unit 212 also includes a second switching operation 236, a third mapping operation 240 and a fourth mapping operation 242, details of which will be described below with respect to FIG. 3a.

In one example, the random number generator 230 generates a trace select signal such as a byte order indicator value, which has a value of 0, which is sent as the control input to the first switching operation 228 and is also the control input to the second switching operation 236. If the trace select signal has the value of "0", the byte order of the inputs to the first and second S-box operations 232a and 232b respectively is maintained identical with respect to the byte order of the output from second multiplexer operation 226. The second switching operation 236 also receives the trace select signal as the control input and does not change the byte order of the outputs from the first and the second S-box operations 232a and 232b respectively. The third mapping operation 240 and the fourth mapping operation 242 are bypassed, the outputs of the second switching operation 236 are sent directly to a third multiplexer 238, details of which will be described below.

In another example, the random number generator 230 generates a trace select signal such as a byte order indicator value, which has a value of 1, which is sent as the control input to the first switching operation 228. If the trace select signal has the value of "1", the byte order of the inputs to the first and second S-box operations 232a and 232b respectively is switched by the first switching operation 228 with respect to the byte order of the output from second multiplexer operation 226 and the second switching operation 236 restores the original byte order in the outputs from the first and second S-box operations 232a and 232b respectively such that the byte order is identical to the byte order of the output from second multiplexer operation 226. Also, in this embodiment, the output data bytes from the second switching block 236 are mapped using the third and the fourth mapping operations 240 and 242 respectively, outputs of which are sent to the third multiplexer 238 details of which will be described below.

The output of third multiplexer operation 238 is the output from the first and the second S-box operations 232a and 232b respectively when trace select signal is "0". If the trace select signal has a value "1", the output of third multiplexer operation 238 is the mapped output of the first and the second S-box operations 232a and 232b respectively using the third mapping 240 and fourth mapping 242 operations respectively. The third mapping 240 and fourth mapping 242 blocks are chosen to map the byte sequence received from second switching operation 236 to the composite-field representation of the MixColumns operation and in turn the common composite-field representation of the intermediate data generated in every encryption/decryption round and stored in data register 216. The composite-field underlying the MixColumns operation can be one of the two composite-fields defining the S-box operations or a completely different composite-field. The output of third multiplexer operation 238 is fed as an input to fourth multiplexer operation 244. Also, the output bytes of the third multiplexer 238 are sent to a first inverse map 260a and a second inverse map 260b. The inverse computation may then be performed in the composite $GF(2^4)^2$ field such that the resulting data is in standard AES Galois-field $GF(2^8)$ by applying an inverse mapping transform $(M^{-1})$ using the first and the second inverse maps 260a and 260b respectively. In one embodiment, the output data bytes from third multiplexer 238 are mapped to native AES Galois-field $GF(2^8)$ during the tenth round of AES computation using the first and second inverse map operations 260a and 260b. During the round key generation operations, the outputs from first and second inverse map operations 260a and 260b are fed to the key generate block 262, whose output is stored in the key register 264. In one embodiment, the output of the first and the second inverse maps 260a and 260b are also sent as an input to a fifth multiplexer 254. In all eleven rounds, another input to the fifth multiplexer 254 is the output of the first XOR operation 214a. The fifth multiplexer passes the output of inverse map operations 260a and 260b to a sixth multiplexer operation 250 during the tenth round of AES computation and the output of first XOR operation 214a during the last (eleventh) round of AES computation to the sixth multiplexer operation 250.

The output of the third multiplexer 238 is fed as an input to a fourth multiplexer 244. Another input to the fourth multiplexer 244 is the random data generated by the random number generator 230. During the first nine rounds of AES computation, the output of fourth multiplexer 244 is the output of the third multiplexer operation 238. During the tenth and eleventh rounds of AES computation, the output of fourth multiplexer is the random data generated by the random number generator 230. The output of the fourth multiplexer 244 is sent to a mix columns operation 246. The mix columns operation 246 operates on four adjacent output bytes from fourth multiplexer operation 244 and generates a new sequence of four bytes, where each byte is a function of all the four bytes in the input sequence. It is designed as a matrix multiplication and accumulation unit where each byte is treated as a polynomial in $GF(2^4)^2$. The output of the mix columns operation 246 is a sequence of 4 bytes, which is further sent to a shift row operation 248 and to a sixth multiplexer 250. The shift row operation 248 permutes the byte order of the input bytes such that the output has a new byte order. The first sequence of four bytes is unchanged and the subsequent four bytes are cyclically shifted with a certain offset. The second sequence of four bytes is shifted with an offset of one to the left and the third and fourth sequence of four bytes are shifted by offsets of two and three respectively. In one embodiment, the outputs of the mixed column operation 246 and the shift row operation 248 are sent to a sixth multiplexer 250. In one embodiment, a plaintext in shift row byte order 252 is an input to the sixth multiplexer 250. In one embodiment, the output of the fifth multiplexer 254 is sent to a sixth multiplexer 250. The output of the sixth multiplexer 250 is sent to the data register 216 for storage. At the beginning of the AES computation operation, the plain text is loaded in shift row byte order into data register block 216 through the sixth multiplexer 250. During the first nine rounds of AES computation, the output of shift rows 248 is passed to the output of sixth multiplexer 250 and is sent to data register 216 for storage. During the tenth round of computation, the output of fifth multiplexer 254, which corresponds to the output of inverse map operations 260a and 260b, is passed to the output of sixth multiplexer 250 and loaded in the data register 216. During the last (eleventh) round of AES computation, the output of fifth multiplexer 254, which corresponds to the output of first XOR operation 214a (also the ciphertext), is directly loaded into data register 216.

Figure 3A:
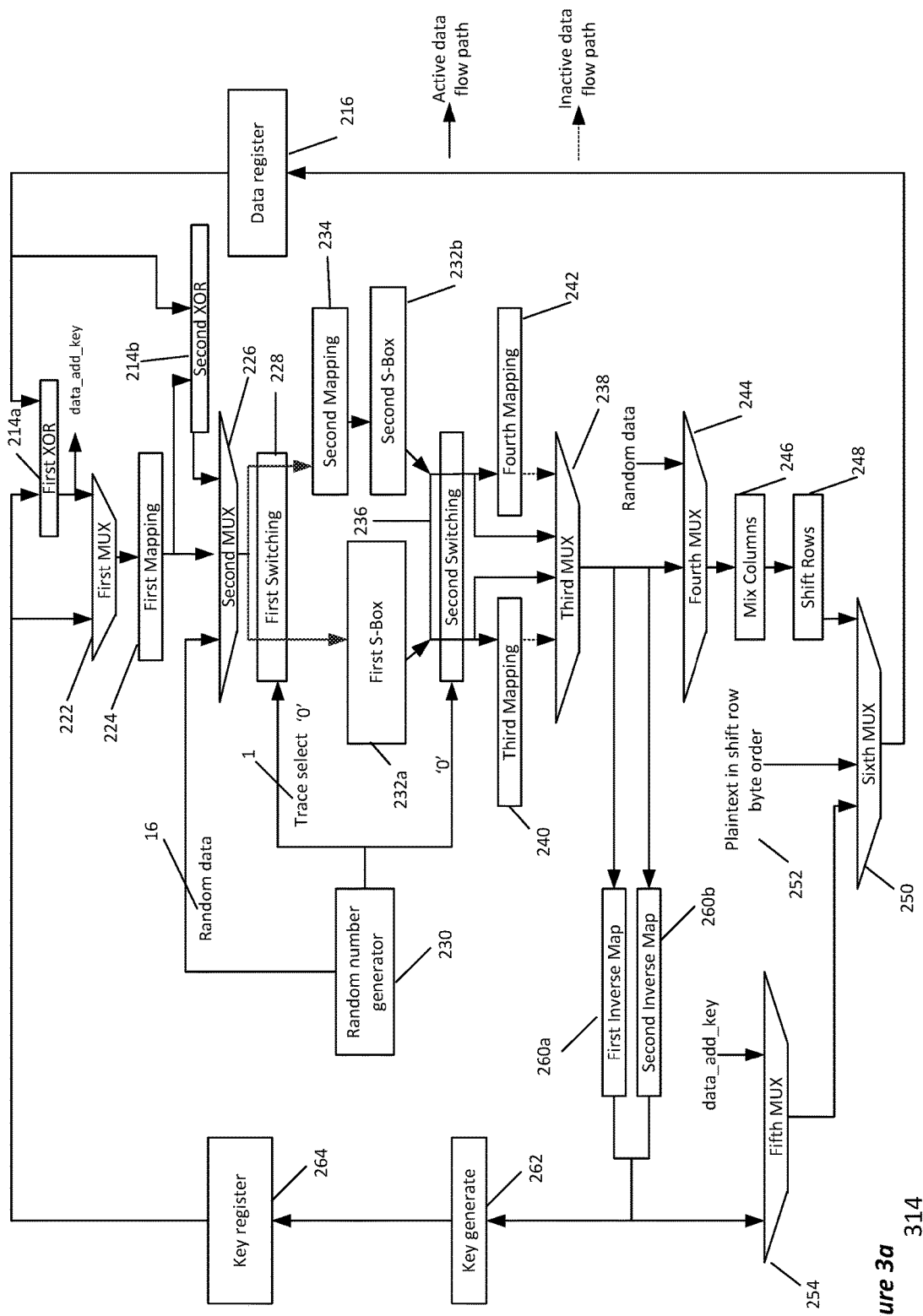
FIG. 3a illustrates a circuit diagram of a trace-based dataflow switching module of the power SCA resistant advanced encryption standard hardware accelerator in the processing system of FIG. 1 according to an embodiment of the present disclosure.

FIG. 3a illustrates a detailed circuit diagram of a trace-based data flow switching module 314 when the random number generator 230 generates a trace select signal such as a byte order indicator value, which has a value of 0 in accordance with an embodiment of the present disclosure. The trace-based data flow switching module 314 is same as the trace-based data flow switching module 114 of FIG. 1. As discussed above, although FIG. 3a illustrates cryptographic computation in the encryption mode, similar circuitry can be utilized for the decryption mode.

In one embodiment, the trace-based data flow switching module 314 of FIG. 3a includes same components as illustrated in FIG. 2 exclusive of the third mapping operation 240 and the fourth mapping operation 242.

In one embodiment, the random number generator 230 generates a trace select signal such as a byte order indicator value, which has a value of 0, which is sent as the control input to the first switching operation 228 and is also the control input to the second switching operation 236. In this embodiment, the output bytes of the second multiplexer operation 226 are directly passed to the outputs of the first switching operation 228 without changing the byte order. The first byte out of the two output bytes from the first switching block 228 is fed to the first S-box operation 232a directly as the data is already in the composite-field that defines the first S-box operation 232a and the second byte from the first switching block 228 is fed to a second mapping operation 234 before feeding it to a second S-box operation 232b. The second mapping operation 234 maps the incoming data byte to the composite-field $GF(2^4)^2$ defining the second S-box operation 232b. The outputs from the first and second S-box operations 232a and 232b respectively are directly passed to the outputs of the second switching operation 236 without changing the byte order and then to the third multiplexer operation 238. Accordingly, in this embodiment, the third and fourth mapping operations 240 and 242 respectively are bypassed.

Figure 3B:
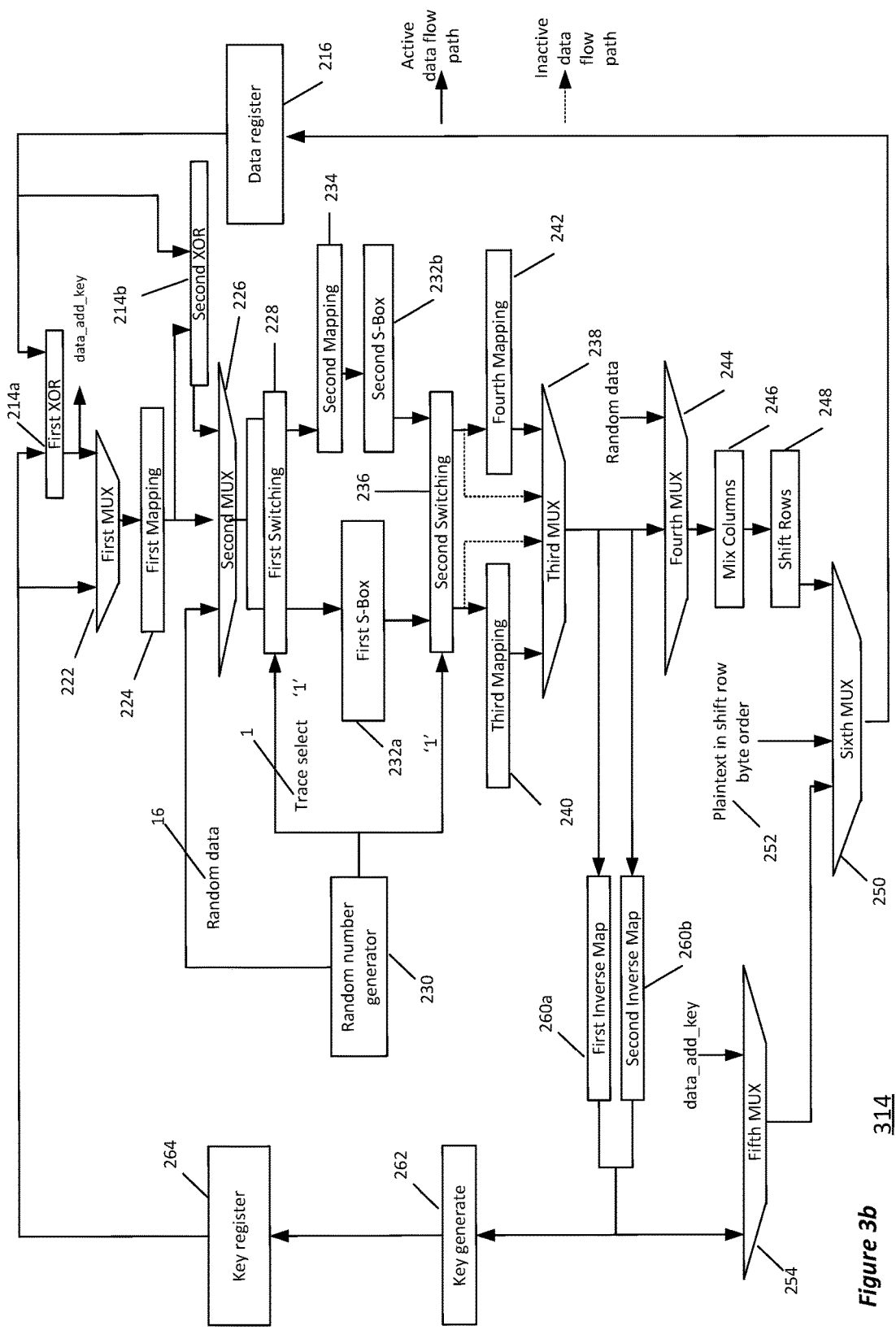
FIG. 3b illustrates a block diagram of a trace-based dataflow switching module of the power SCA resistant advanced encryption standard hardware accelerator in the processing system of FIG. 1 according to an embodiment of the present disclosure.

FIG. 3b illustrates a detailed circuit diagram of a trace-based data flow switching module 314 when the random number generator 230 generates a trace select signal such as a byte order indicator value, which has a value of 1 in accordance with an embodiment of the present disclosure. The trace-based data flow switching module 314 is same as the trace-based data flow switching module 114 of FIG. 1. As discussed above, although, FIG. 3b illustrates cryptographic computation in the encryption mode, similar circuitry can be applied for the decryption mode.

In one embodiment, the trace-based data flow switching module 314 of FIG. 3a includes same components as illustrated in FIG. 2.

In one embodiment, the random number generator 230 generates a trace select signal such as a byte order indicator value, which has a value of 1, which is sent as the control input to the first switching operation 228 and also as the control input to the second switching operation 236. The first switching operation 228 changes the byte order of its input data bytes. The second byte out of the two input bytes is sent to the first S-box operation 232a directly, as the data is already in the composite-field that defines the first S-box operation 232a. The first byte out of the two input bytes is sent to the second mapping operation 234 for mapping it in the composite-field $GF(2^4)^2$ defining the second S-box operation 232b. The mapped data byte from the second mapping operation 234 is sent to the second S-box operation 232b. The computations of the first and the second S-box operations 232a and 232b respectively are sent to a second switching operation 236. The second switching operation 236 restores the original (i.e., before the first switching operation) order of the 2 byte data using the trace select signal generated by the random number generator 230 as its control input.

In one embodiment, when the random number generator 230 generates a trace select signal such as value of 1, the output computation of the second S-box operation 232b is sent to a third mapping operation 240 to map it to a composite-field $GF(2^4)^2$ suitable for further processing in mix columns 246 prior to sending it to the third multiplexer 238. Also, the output computation of the first S-box operation 232a is sent to a fourth mapping operation 242 to map it to a composite-field $GF(2^4)^2$ suitable for further processing in mix columns 246 prior to sending it to the third multiplexer 238. The output of third multiplexer 238 is sent to further processing prior to storage in data register 216, details of which can be found above with respect to FIG. 2.

Figure 4:
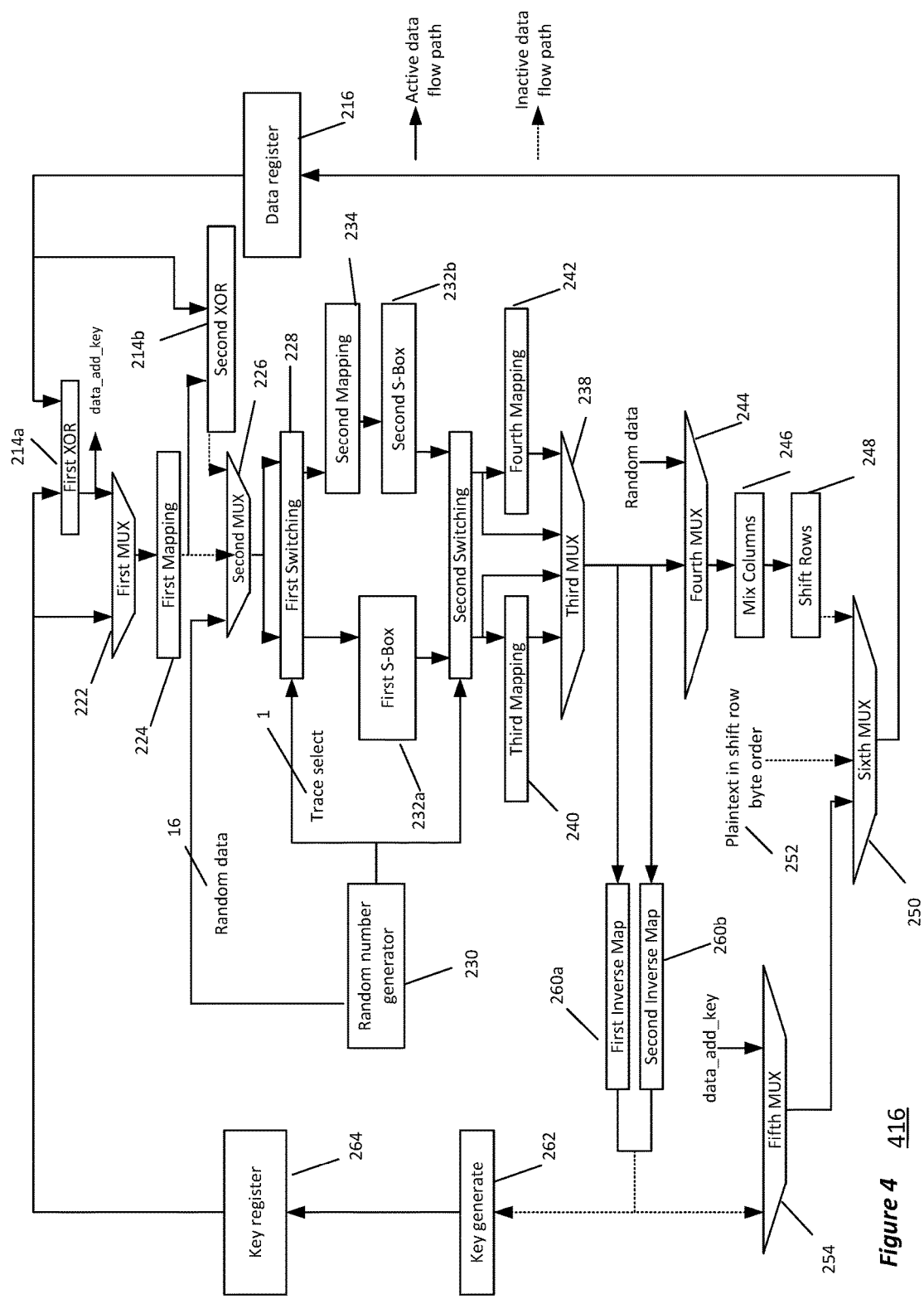
FIG. 4 illustrates a block diagram of a data independent S-box and mix column computation module of the SCA power resistant advanced encryption standard hardware accelerator in the processing system of FIG. 1 according to an embodiment of the present disclosure.

FIG. 4 illustrates a detailed circuit diagram of a data-independent S-box and mix columns computation module 416 in accordance with an embodiment of the present disclosure. The data-independent S-box and mix columns computation module 416 is same as the data-independent S-box and mix columns computation module 116 of FIG. 1. As discussed above, the data-independent S-box and mix columns computation module 416 functions to mask data power dependency by utilizing S-box operation and Mix-Column operations to perform completely uncorrelated operations to mask power consumption of round key addition during a last (eleventh) round of AES cryptographic computation. Although, FIG. 4 illustrates cryptographic computation in an encryption mode, similar computation can be applied in a decryption mode.

In one embodiment, the data-independent S-box and mix columns computation module 416 of FIG. 4 includes same components as illustrated in FIG. 2 without utilization of the first multiplexer 222, first mapping operation 224, second XOR operation 214b and key generate operation 262 and shift rows operation 248.

In one embodiment, the data-independent S-box and mix columns computation module 416 of FIG. 4 functions similar to the FIGS. 3a and 3b but since the first and the second S-box operations 232a and 232b respectively and the mix columns operation 246 do not contribute to ciphertext generation in the last round, the power SCA resistant AES hardware accelerator unit 212 utilizes them to perform uncorrelated operations to mask the current signature from key addition. The uncorrelated data for the first and the second S-box operations 232a and 232b respectively and the mix columns operation 246 are generated by the random number generator 230. Since, it is known that the S-box operations contribute for majority of power consumption in the AES hardware accelerator, the higher power consumption profiles from the first and the second S-box operations 232a and 232b respectively and the mix columns operation 246 mask the power consumption information of round key addition, which is typically multiple orders of magnitude lower than the first and the second S-box operations 232a and 232b respectively and the mix columns operation 246. Once, the key addition is completed, the computed data (ciphertext) is loaded into the data register 216.

Figure 5A:
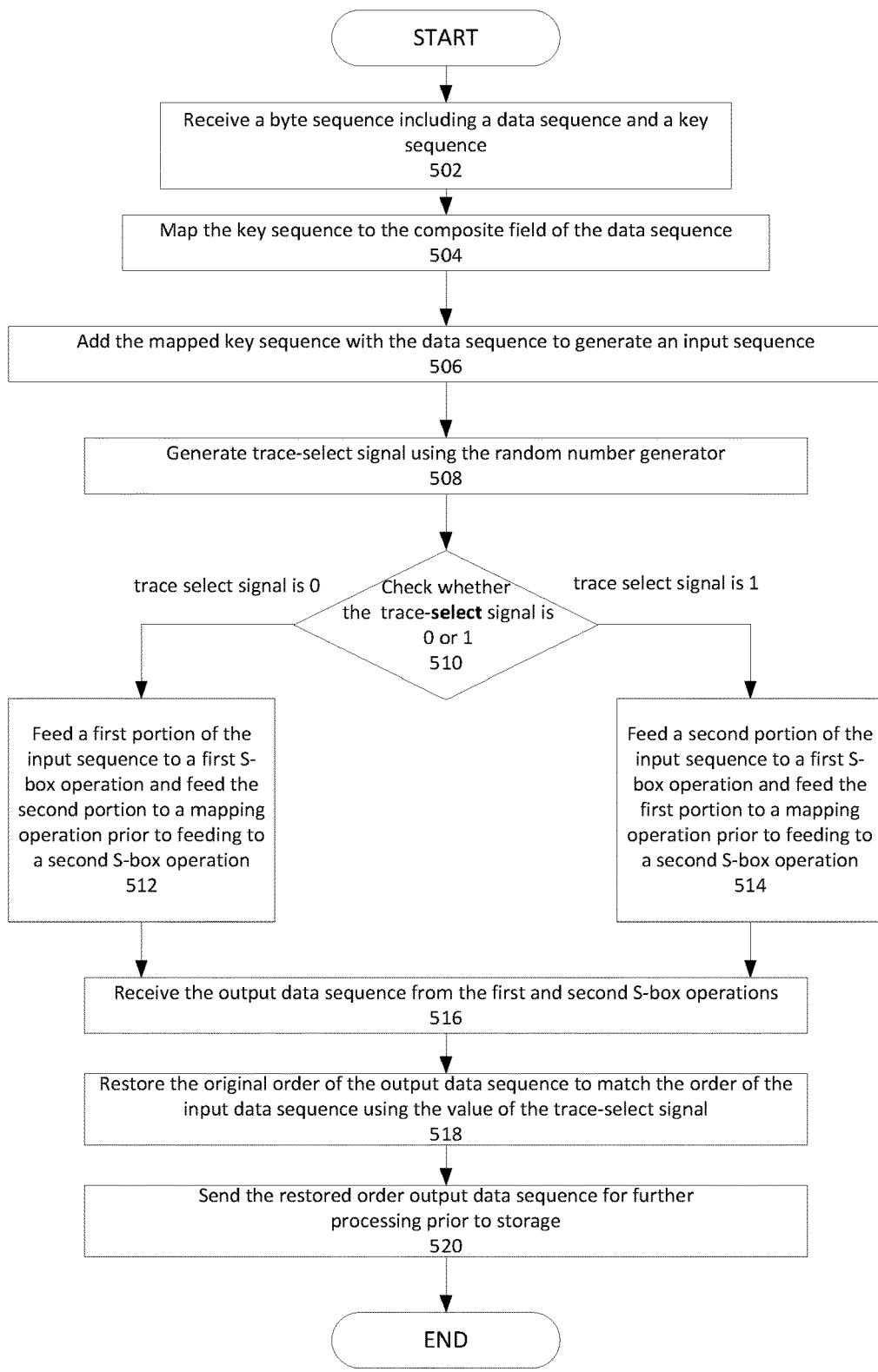
FIG. 5A illustrates a flow diagram for performing cryptography in processors with tolerance to power side-channel attacks during first ten rounds of advanced encryption standard computation according to an embodiment of the present disclosure.

FIG. 5A illustrates a flow diagram of a method for performing cryptography in processors with tolerance to power side-channel attacks during first ten rounds of AES computation according to an embodiment of the present disclosure. Method 500 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 500 may be performed, in part, by processing logics of any one of processing cores 110 executing an operating system with respect to FIG. 1.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

Referring to FIG. 5A, at block 502, the processing logic receives a byte sequence including a data sequence and a key sequence. In one embodiment, the data sequence includes a plurality of data bits and the input key sequence includes a plurality of key bits. At block 504, map the input key sequence to a composite field of the data sequence. At block 506 add the mapped key sequence with the data sequence to generate an input sequence. At block 508 generate trace-select signal (such as a byte order indicator value) using a random number generator. At block 510, it is determined whether a value of the trace-select signal is 0 or 1. At block 512, feed a first portion of the input sequence to a first S-box operation and feed a second portion of the input sequence to a mapping operation prior to feeding to a second S-box operation when it is determined that the value of the trace-select signal is 0. At block 514, feed a second portion of the input sequence to the first S-box operation and feed the first portion of the input sequence to a mapping operation prior to sending to a second S-box operation when it is determined that the value of the trace-select signal is 1. At block 516, receive output data sequence computed by the first and the second S-box operations. At block 518, restore the original order of the output data sequence to match with the order of the input data sequence using the value of the trace-select signal. At block 520, send the restored order output data sequence for further processing prior to storage.

Figure 5B:
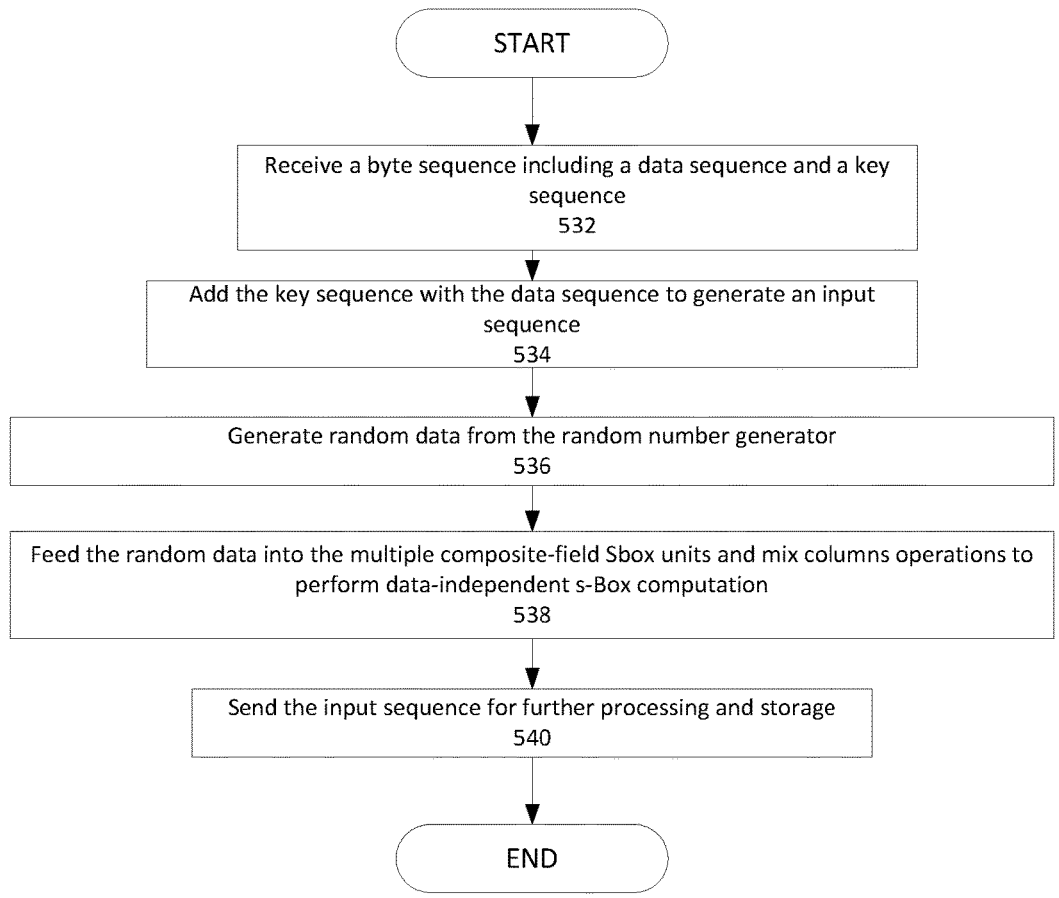
FIG. 5B illustrates a flow diagram for performing cryptography in processors with tolerance to power side-channel attacks during the last round of advanced encryption standard computation according to an embodiment of the present disclosure.

FIG. 5B illustrates a flow diagram of a method for performing cryptography in processors with tolerance to power side-channel attacks during the eleventh (last) round of AES computation according to an embodiment of the present disclosure. Method 530 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 530 may be performed, in part, by processing logics of any one of processing cores 110 executing an operating system with respect to FIG. 1.

For simplicity of explanation, the method 530 is depicted and described as a series of acts. However, acts in accordance with this disclosure can occur in various orders and/or concurrently and with other acts not presented and described herein. Furthermore, not all illustrated acts may be performed to implement the method 530 in accordance with the disclosed subject matter. In addition, those skilled in the art will understand and appreciate that the method 530 could alternatively be represented as a series of interrelated states via a state diagram or events.

Referring to FIG. 5B, at block 532, the processing logic to receive a byte sequence including a data sequence and a key sequence. In one embodiment, the data sequence includes a plurality of data bits and the key sequence includes a plurality of key bits. At block 534, add the data sequence with key sequence to generate an input sequence. At block 536, generate a random data from the random number generator. At block 538, feed the random data into the multiple composite-field heterogeneous S-box units and mix columns operation to perform data-independent S-box and mix columns computation. At block 540, send the input sequence for further processing and storage.

Figure 6A:
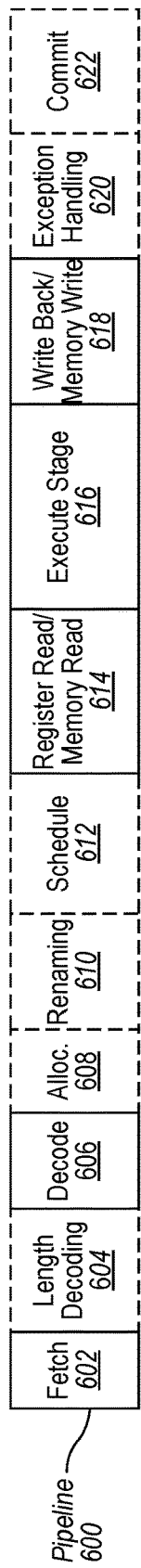
FIG. 6A is a block diagram illustrating a micro-architecture for a processor in which one embodiment of the disclosure may be used.
Figure 6B:
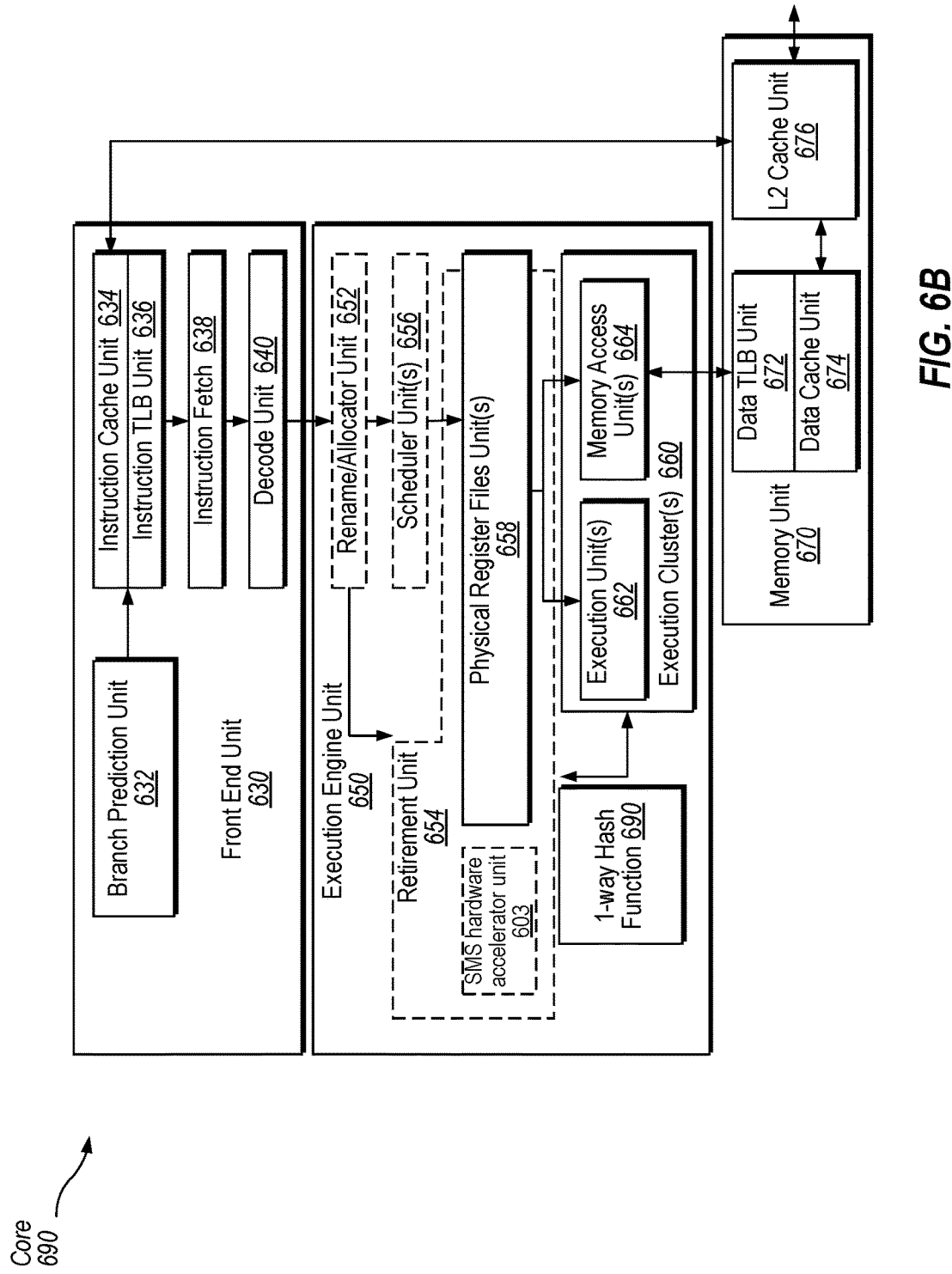
FIG. 6B is a block diagram illustrating an in-order pipeline and a register renaming stage, out-of-order issue/execution pipeline implemented according to at least one embodiment of the disclosure.

FIG. 6A is a block diagram illustrating an in-order pipeline and a register re-naming stage, out-of-order issue/execution pipeline of a processor monitoring performance of a processing device to manage non-precise events according to at least one embodiment of the invention. FIG. 6B is a block diagram illustrating an in-order architecture core and a register renaming logic, out-of-order issue/execution logic to be included in a processor according to at least one embodiment of the invention. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the stages are provided in a different order and different stages may be considered in-order and out-of-order.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 70.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The retirement unit 654 may include a power SCA resistant AES hardware accelerator unit 603 for performing cryptography in processors with tolerance to power side-channel attacks according to embodiments of the invention. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 38 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
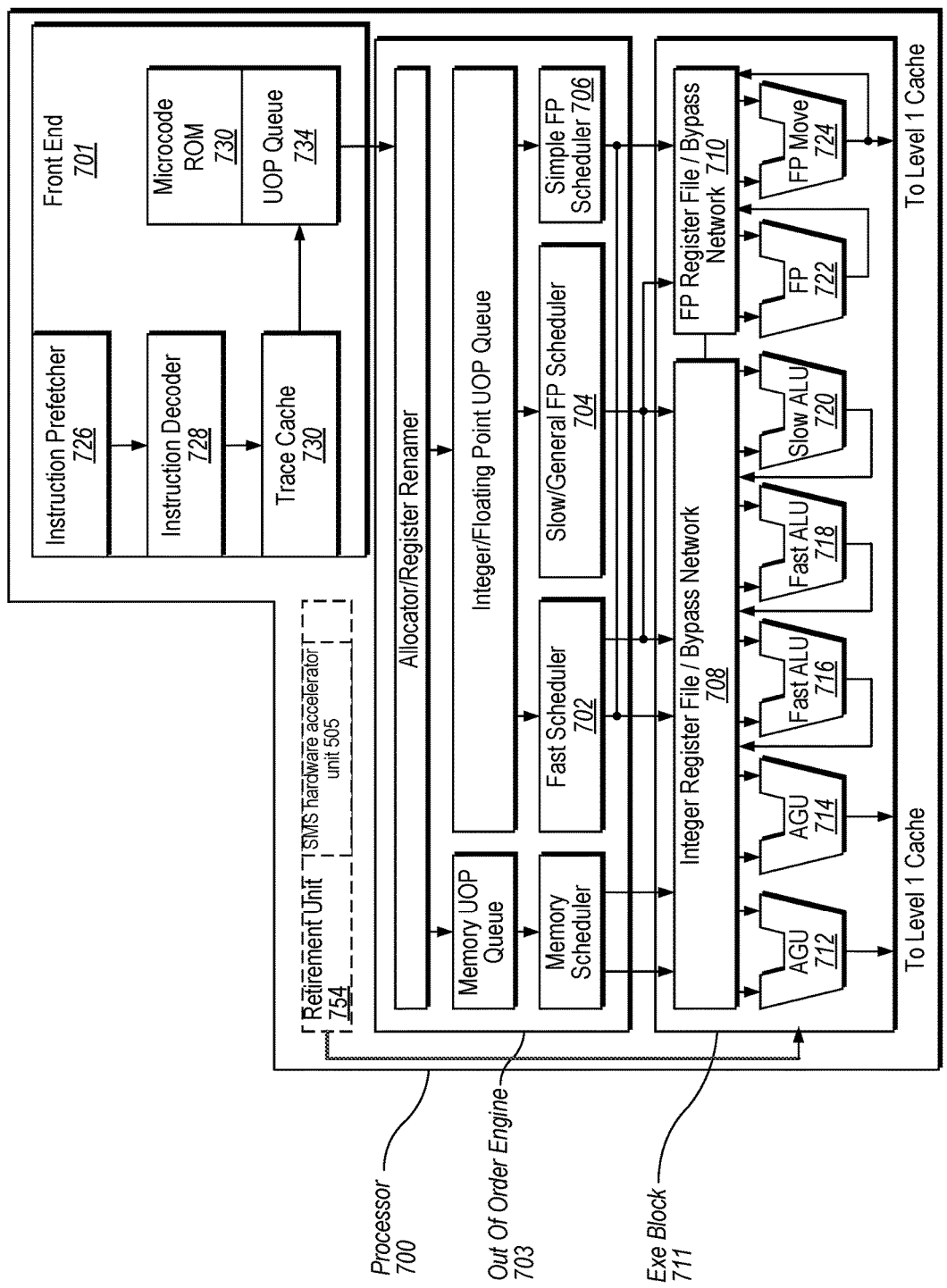
FIG. 7 illustrates a block diagram of the micro-architecture for a processor in accordance with one embodiment of the disclosure.

FIG. 7 is a block diagram illustrating a micro-architecture for a processor 700 that includes logic circuits to perform instructions in accordance with one embodiment of the invention. In one embodiment, processor 700 monitors performance of a processing device to manage non-precise events. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 701 is the part of the processor 700 that fetches instructions to be executed and prepares them to be used later in the processor pipeline. The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others use several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops use to complete their operation. The fast scheduler 702 of one embodiment can schedule on each half of the main clock cycle while the other schedulers can schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 66 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions use to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 54 bit floating point divider to execute divide, square root, and remainder micro-ops. For embodiments of the invention, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720 are described in the context of performing integer operations on 64 bit data operands. In alternative embodiments, the ALUs 716, 718, 720 can be implemented to support a variety of data bits including 16, 32, 128, 256, etc. Similarly, the floating point units 722, 724 can be implemented to support a range of operands having bits of various widths. For one embodiment, the floating point units 722, 724 can operate on 128 bits wide packed data operands in conjunction with SIMD and multimedia instructions.

In one embodiment, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 700 may include a retirement unit 754 coupled to the execution block 711. The retirement unit 754 may include a power SCA resistant AES hardware accelerator unit 705 for performing cryptography in processors with tolerance to power side-channel attacks.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 8:
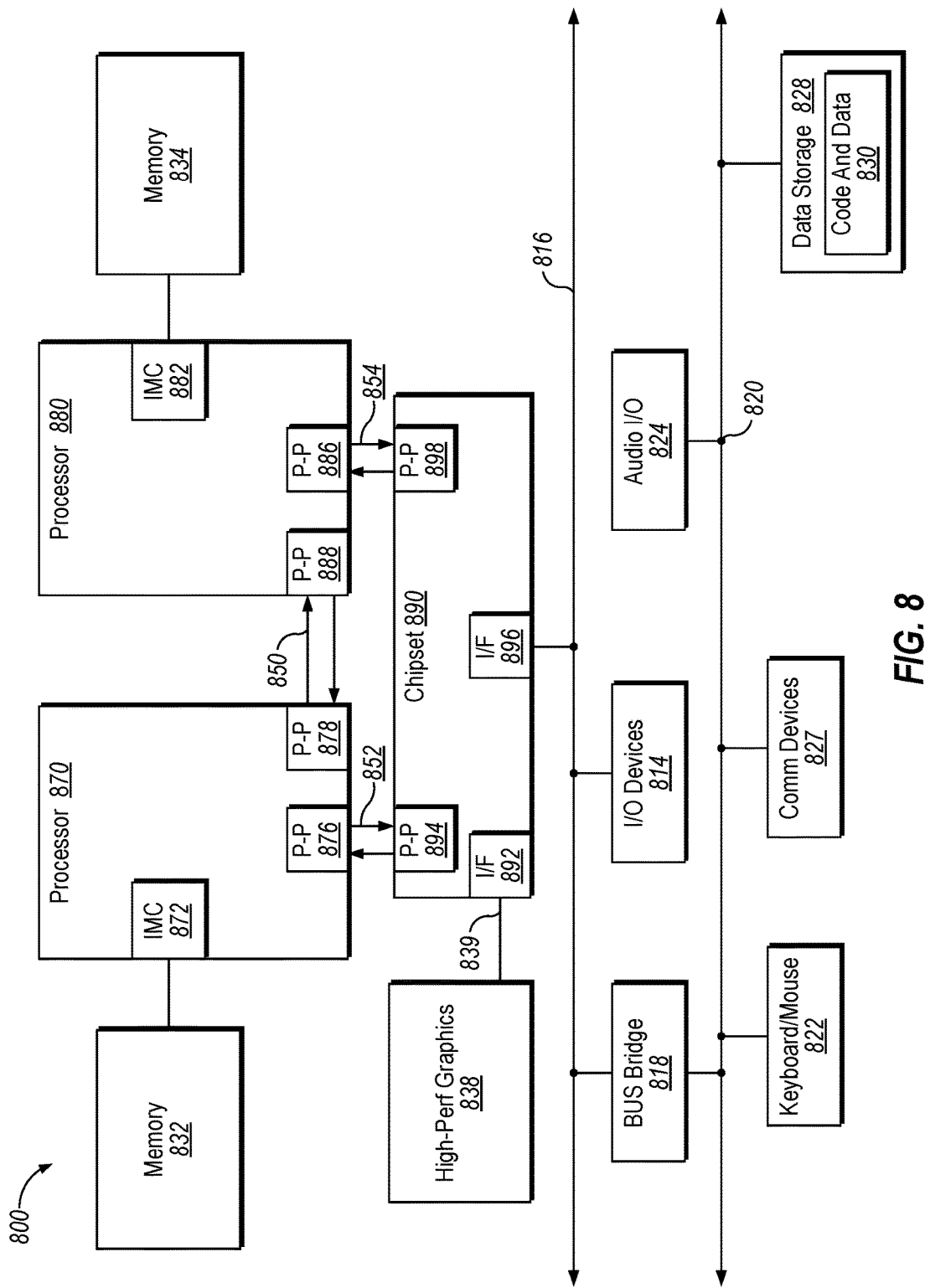
FIG. 8 is a block diagram illustrating a system in which an embodiment of the disclosure may be used.

Referring now to FIG. 8, shown is a block diagram of a system 800 in accordance with one embodiment of the invention. The system 800 may include one or more processors 810, 815, which are coupled to graphics memory controller hub (GMCH) 820. The optional nature of additional processors 815 is denoted in FIG. 8 with broken lines. In one embodiment, a processor 810, 815 monitors performance of a processing device to manage non-precise events.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
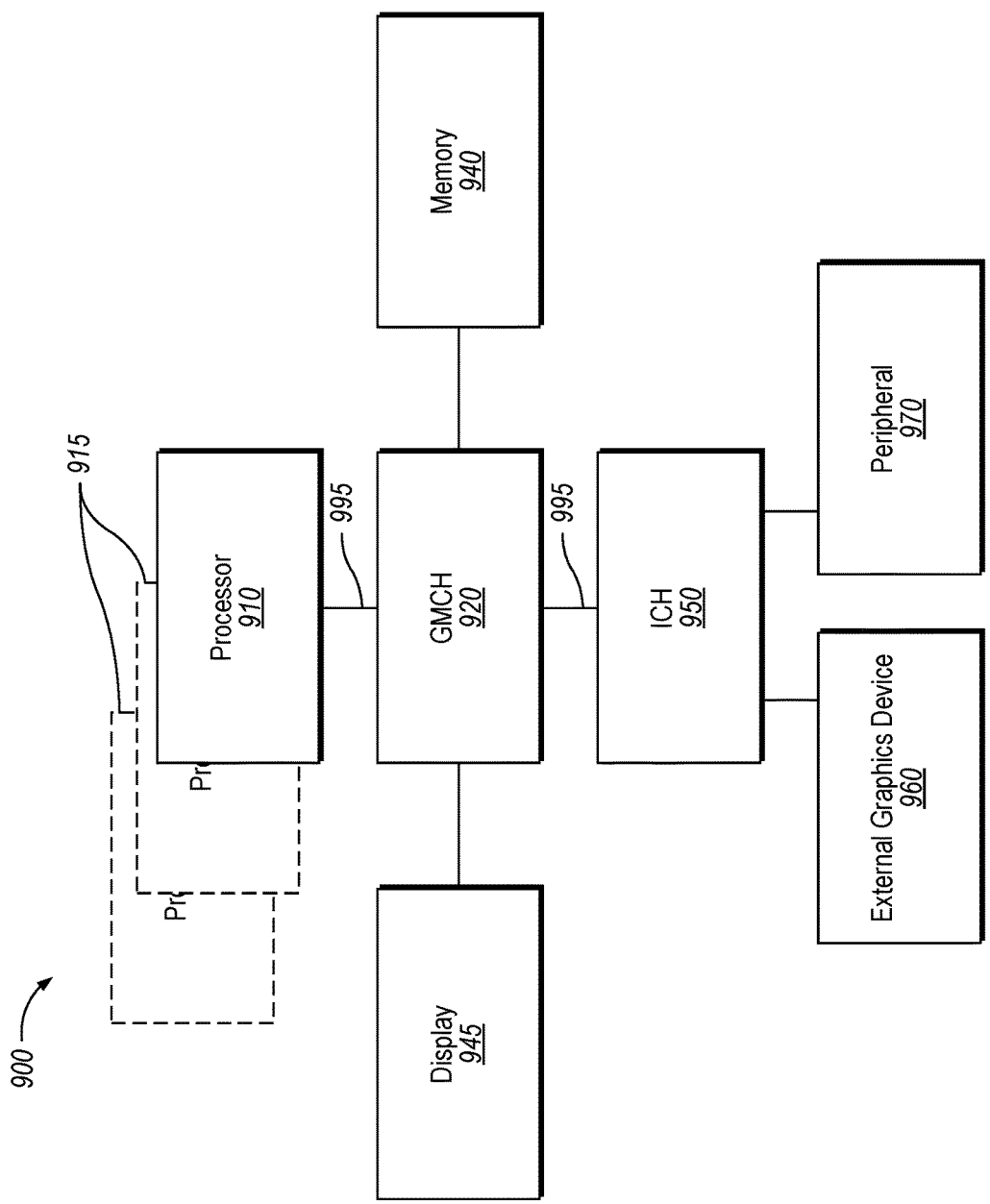
FIG. 9 is a block diagram of a system in which an embodiment of the disclosure may operate.

Embodiments may be implemented in many different system types. FIG. 9 is a block diagram of a SoC 900 in accordance with an embodiment of the present disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one embodiment, a memory module may be included in the integrated memory controller unit(s) 914. In another embodiment, the memory module may be included in one or more other components of the SoC 900 that may be used to access and/or control a memory. The application processor 920 may include a conditional branch, indirect branch and event execution logics as described in embodiments herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multi-threading.

The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, Atom™, XScale™ or StrongARM™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
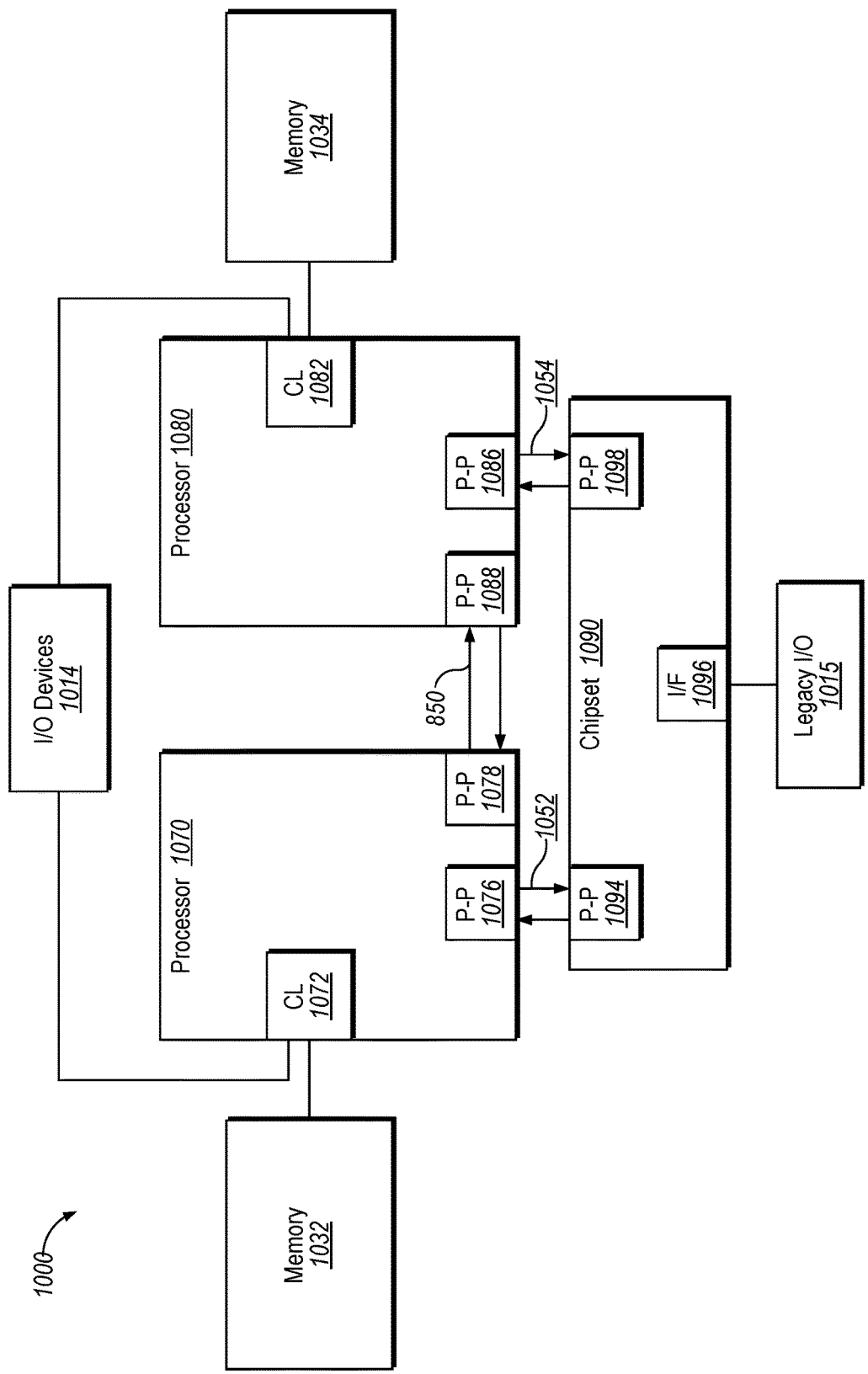
FIG. 10 is a block diagram of a system in which an embodiment of the disclosure may operate.

FIG. 10 is a block diagram of an embodiment of a system on-chip (SoC) design in accordance with the present disclosure. As a specific illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1008 and L2 cache 1010 to communicate with other parts of system 1000. Interconnect 1010 includes an on-chip interconnect, such as an IOSF, AMBA, or other interconnect discussed above, which potentially implements one or more aspects of the described disclosure. In one embodiment, a conditional branch, indirect branch and event execution logics may be included in cores 1006, 1007.

Interconnect 1010 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g.

Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
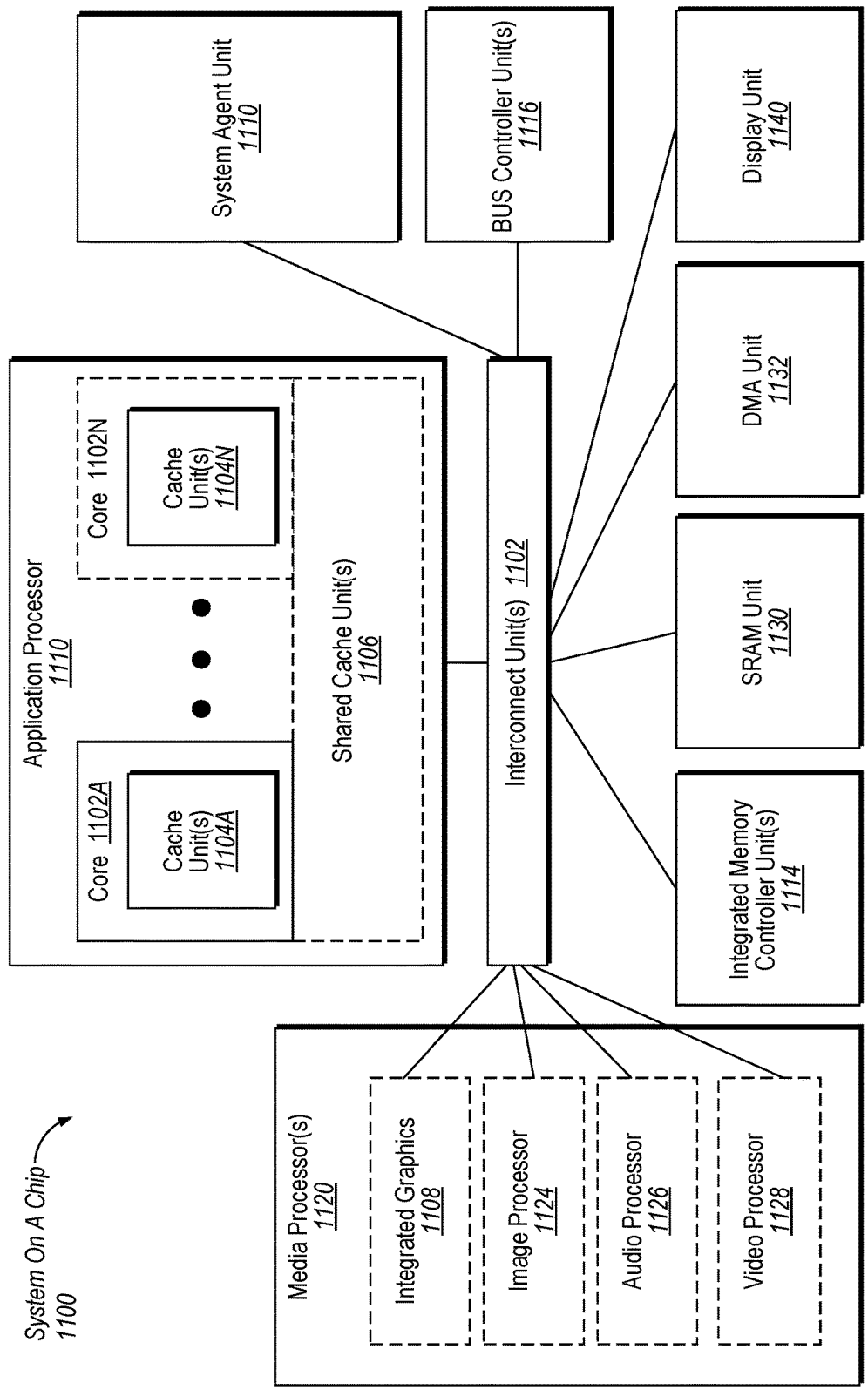
FIG. 11 is a block diagram of a System-on-a-Chip (SoC) in accordance with an embodiment of the present disclosure

Referring now to FIG. 11, shown is a block diagram of a system 1100 in accordance with an embodiment of the invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processors of the computing systems as described herein. In one embodiment, processors 1170, 1180 monitoring performance of a processing device to manage non-precise events to monitor performance of a processing device to manage non-precise events.

While shown with two processors 1170, 1180, it is to be understood that the scope of the disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170 and 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1116. In one embodiment, first bus 1116 may be a Peripheral Component Interconnect (PCI) bus, or a bus such as a PCI Express bus or another third generation I/O interconnect bus, although the scope of the disclosure is not so limited.

As shown in FIG. 11, various I/O devices 1114 may be coupled to first bus 1116, along with a bus bridge 1118, which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
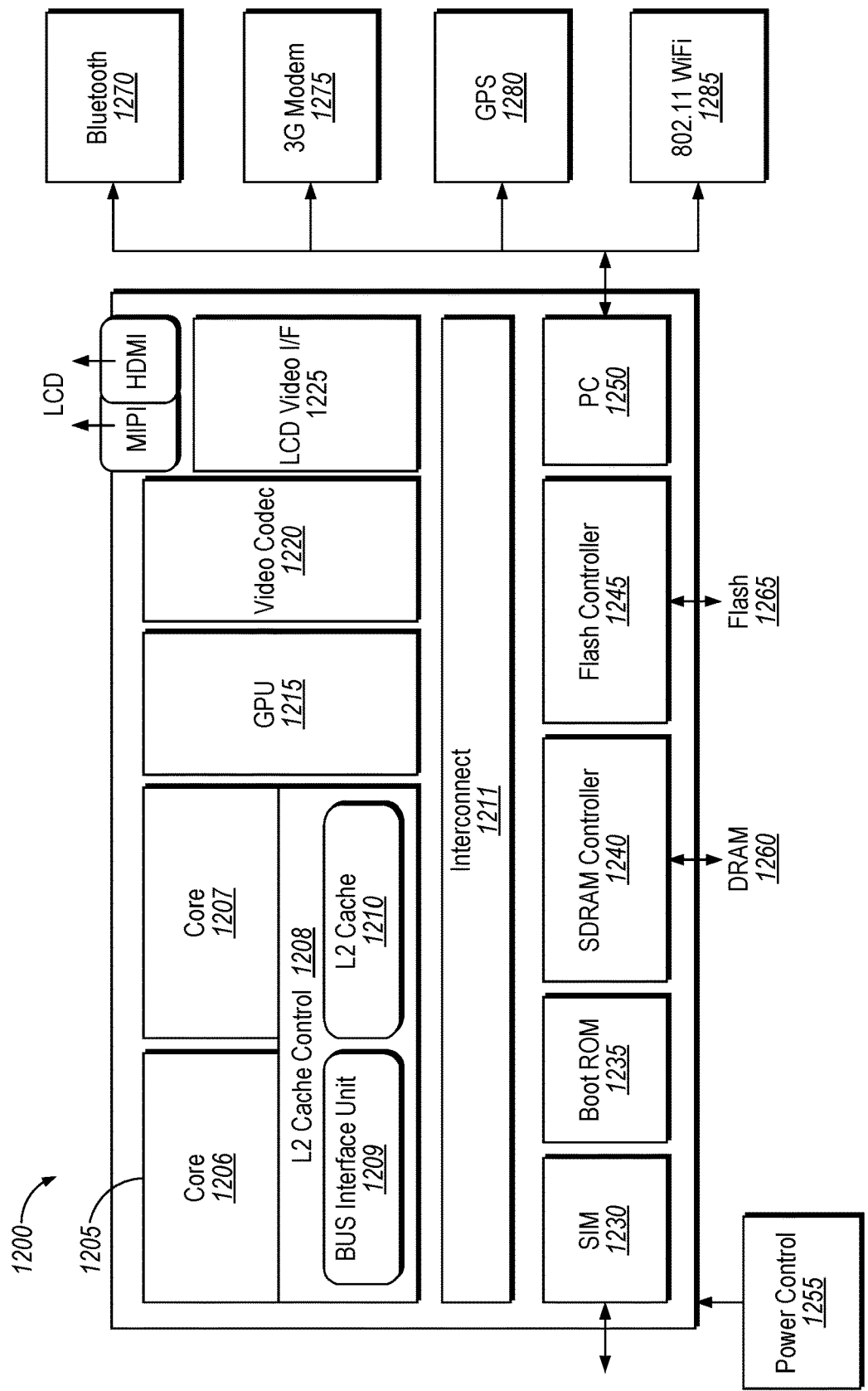
FIG. 12 is a block diagram of an embodiment of a SoC design in accordance with the present disclosure.

Referring now to FIG. 12, shown is a block diagram of a system 1200 in accordance with an embodiment of the invention. FIG. 12 illustrates processors 1270, 1280. In one embodiment, processors 1270, 1280 monitor performance of a processing device to manage non-precise events. Furthermore, processors 1270, 1280 may include integrated memory and I/O control logic ("CL") 1272 and 1282, respectively and intercommunicate with each other via point-to-point interconnect 1250 between point-to-point (P-P) interfaces 1278 and 1288 respectively. Processors 1270, 1280 each communicate with chipset 1290 via point-to-point interconnect 1252 and 1254 through the respective P-P interfaces 1276 to 1294 and 1286 to 1298 as shown. For at least one embodiment, the CL 1272, 1282 may include integrated memory controller units. CLs 1272, 1282 may include I/O control logic. As depicted, memories 1232, 1234 coupled to CLs 1272, 1282 and I/O devices 1214 are also coupled to the control logic 1272, 1282. Legacy I/O devices 1215 are coupled to the chipset 1290 via interface 1296.

Figure 13:
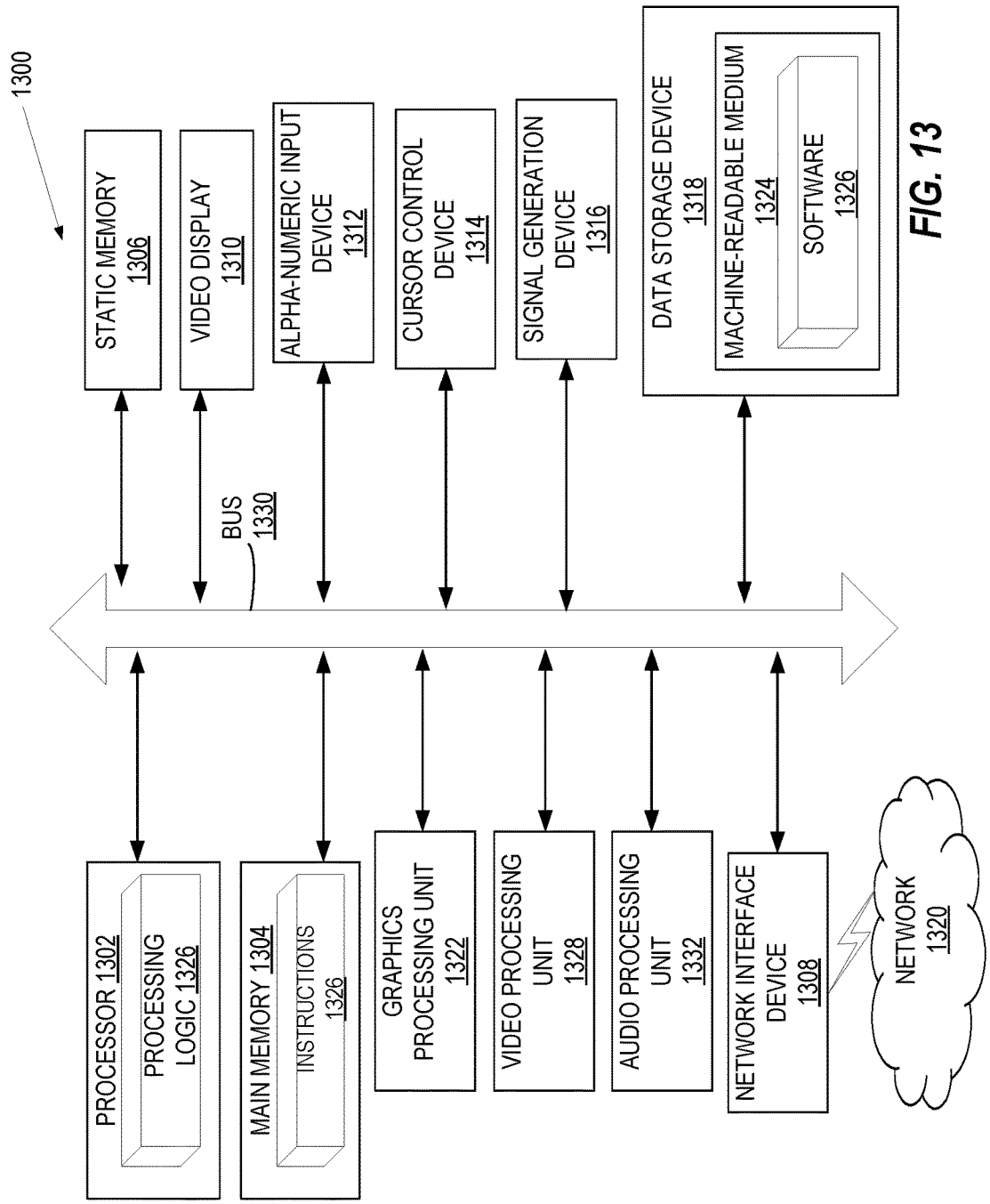
FIG. 13 illustrates a block diagram of a machine in form of a computing system in accordance with the present disclosure.

FIG. 13 illustrates a diagrammatic representation of a machine in the example form of a computing system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1418, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations discussed herein. In one embodiment, processing device 1302 is the same as computer systems 100 and 200 as described with respect to FIG. 1 that implements the NPEBS module 106. Alternatively, the computing system 1300 can include other components as described herein.

The computing system 1300 may further include a network interface device communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another embodiment, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the NPEBS module 106 described with respect to FIG. 1 and/or a software library containing methods that call the above applications. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing system comprising a processing core; and a hardware accelerator for performing AES cryptographic operation, the hardware accelerator communicatively coupled to the processing core, the hardware accelerator comprising a random number generator to generate a byte order indicator; and a first switching module communicatively coupled to the random number generator, the first switching module to receive an input byte sequence in an encryption round of the cryptographic operation; and feed a portion of the input byte sequence to one of a first substitute box (S-box) module or a second S-box module based on a byte order indicator value generated by the random number generator.

In Example 2, the subject matter of Example 1 can optionally include wherein the first switching module feeds a remaining portion of the input byte sequence to one of the first S-box module or the second S-box module based on the byte order indicator generated by the random number generator.

In Example 3, the subject matter of Examples 1-2 can optionally include wherein the random number generator is reseeded with an intermediate value from a data register at the beginning of each one of a encryption and decryption round of the cryptographic operation.

In Example 4, the subject matter of Examples 1-3 can optionally include wherein the first S-box module is associated with a $GF(2^4)^2$ composite Galois-field defined by characteristic polynomials calculated to minimize implementation area of the hardware accelerator and one of minimize or maximize a power consumption profile.

In Example 5, the subject matter of Examples 1-4 can optionally include wherein the second S-box module is associated with a $GF(2^4)^2$ composite Galois-field defined by characteristic polynomials calculated to minimize implementation area of the hardware accelerator and one of minimize or maximize a power consumption profile.

In Example 6, the subject matter of Examples 1-5 can optionally include a switching module coupled to the first S-box module to restore an original order of data bytes in a output byte sequence of the first S-box module; and a mapping module coupled to the switching module to restore data in the output byte sequence to a common composite field representation In Example 7, the subject matter of Examples 1-6 can optionally include a switching module coupled to the second S-box module to restore original order of data bytes in a output byte sequence of the second S-box module; and a mapping module coupled to the switching module to restore data in the output byte sequence to a common composite field representation.

In Example 8, the subject matter of Examples 1-7 can optionally include wherein in at a last round of the encryption round of the cryptographic computation, the random value indicator generator to feed random data to a mix columns module and at least one of the first S-box module or the second S-box module.

Example 9 is a system-on-a chip (SoC) comprising a memory; and a processor, communicatively coupled to the memory, comprising a processing core; and a hardware accelerator for performing AES cryptographic operation, the hardware accelerator communicatively coupled to the processing core, the hardware accelerator comprising a random number generator to generate a byte order indicator; and a first switching module communicatively coupled to the random value generator, the first switching module to receive an input byte sequence in an encryption round of the cryptographic operation; and feed a portion of the input byte sequence to one of a first substitute box (S-box) module or a second S-box module based on a byte order indicator value generated by the random number generator.

In Example 10 the subject matter of Example 9 can optionally include wherein the first switching module feeds a remaining portion of the input byte sequence to one of the first S-box module or the second S-box module based on the byte order indicator generated by the random number generator.

In Example 11, the subject matter of Examples 9-10 can optionally include wherein the random number generator is reseeded with an intermediate value from a data register at the beginning of every one of a encryption and decryption round of the cryptographic operation.

In Example 12, the subject matter of Examples 9-11 can optionally include wherein the one of the first S-box module or the second S-box module is associated with a $GF(2^4)^2$ composite Galois-field defined by characteristic polynomials calculated to minimize implementation area of the hardware accelerator and one of minimize or maximize a power consumption profile.

In Example 13, the subject matter of Examples 9-12 can optionally include a switching module coupled to the first S-box module to restore an original order of data bytes in an output byte sequence of the first S-box module; and a mapping module coupled to the switching module to restore data in the output byte sequence to a common composite field representation In Example 14, the subject matter of Examples 9-13 can optionally include a switching module coupled to the second S-box module to restore original order of data bytes in an output byte sequence of the second S-box module; and a mapping module coupled to the switching module to restore data in the output byte sequence to a common composite field representation.

In Example 15, the subject matter of Examples 9-14 can optionally include wherein in at a last round of the encryption round of the cryptographic computation, the random value indicator generator feeds random data to a mix columns module and at least one of the first S-box module or the second S-box module.

Example 16 is a method comprising receiving an input byte sequence in an encryption round of the cryptographic operation; and feeding a portion of the input byte sequence to one of a first substitute box (S-box) module or a second S-box module based on a byte order indicator value generated by a random number generator.

In Example 17, the subject matter of Example 16 can optionally include feeding a remaining portion of the input byte sequence to one of the first S-box module or the second S-box module based on the byte order indicator generated by the random number generator.

In Example 18, the subject matter of Examples 16-17 can optionally include wherein the first S-box module is associated with a $GF(2^4)^2$ composite Galois-field defined by characteristic polynomials calculated to minimize implementation area of the hardware accelerator and the second S-box module is associated with the $GF(2^4)^2$ composite Galois-field defined by characteristic polynomials calculated to minimize implementation area of the hardware accelerator.

In Example 19, the subject matter of Examples 16-18 can optionally include restoring an original order of data bytes in an output of the first S-box module and restoring an original order of data bytes in an output of the second S-box module.

In Example 20, the subject matter of Examples 16-19 can optionally include feeding random data to a mix columns module and at least one of the first S-box module or the second S-box module in a last round of the encryption round of the cryptographic computation.

Example 21 is a non-transitory machine-readable storage medium including instructions that, when accessed by a processing device, cause the processing device to perform operations comprising receiving an input byte sequence in an encryption round of the cryptographic operation; and feeding a portion of the input byte sequence to one of a first substitute box (S-box) module or a second S-box module based on a byte order indicator value generated by a random number generator.

In Example 22, the subject matter of Example 21 can optionally include feeding a remaining portion of the input byte sequence to one of the first S-box module or the second S-box module based on the byte order indicator generated by the random number generator.

In Example 23, the subject matter of Examples 21-22 can optionally include wherein the first S-box module is associated with a $GF(2^4)^2$ composite Galois-field defined by characteristic polynomials calculated to minimize implementation area of the hardware accelerator and the second S-box module is associated with the $GF(2^4)^2$ composite Galois-field defined by characteristic polynomials calculated to minimize implementation area of the hardware accelerator.

In Example 24, the subject matter of Examples 21-23 can optionally include restoring an original order of data bytes in an output of the first S-box module; and restoring an original order of data bytes in an output of the second S-box module.

In Example 25, the subject matter of Examples 21-24 can optionally include feeding random data to a mix columns module and at least one of the first S-box module or the second S-box module in a last round of the encryption round of the cryptographic computation.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A processing system comprising:
a processing core; and
a hardware accelerator for performing an AES cryptographic operation, the hardware accelerator communicatively coupled to the processing core, the hardware accelerator comprising:
a random number generator to generate a byte order indicator value, wherein the random number generator is reseeded with an intermediate value from a data register at a beginning of each encryption round of the AES cryptographic operation; and
a first switching module communicatively coupled to the random number generator, the first switching module to:
receive an input byte sequence in an encryption round of the AES cryptographic operation; and
feed a first portion of the input byte sequence, which is less than an entirety of the input byte sequence, to one of a first substitute box (S-box) module or a second S-box module based on, and in response to, the byte order indicator value generated by the random number generator.

2. The processing system of claim 1, wherein the first switching module is to feed a remaining portion of the input byte sequence to one of the first S-box module or the second S-box module based on the byte order indicator value generated by the random number generator.

3. The processing system of claim 1, wherein the first S-box module is associated with a $GF(2^4)^2$ composite Galois-field defined by characteristic polynomials calculated to minimize implementation area of the hardware accelerator and one of minimize or maximize a power consumption profile of the hardware accelerator.

4. The processing system of claim 1, wherein the second S-box module is associated with a $GF(2^4)^2$ composite Galois-field defined by characteristic polynomials calculated to minimize implementation area of the hardware accelerator and one of minimize or maximize a power consumption profile of the hardware accelerator.

5. The processing system of claim 1, further comprising:
a second switching module coupled to the first S-box module to restore an original order of data bytes in a output byte sequence of the first S-box module; and
a mapping module coupled to the second switching module to restore data in the output byte sequence to a common composite field representation.

6. The processing system of claim 1, further comprising:
a second switching module coupled to the second S-box module to restore original order of data bytes in a output byte sequence of the second S-box module; and
a mapping module coupled to the second switching module to restore data in the output byte sequence to a common composite field representation.

7. The processing system of claim 1, wherein in a last round of the encryption round of the AES cryptographic operation, the random value indicator generator is to feed random data to a mix columns module and at least one of the first S-box module or the second S-box module.

8. A system-on-a chip (SoC) comprising:
a memory; and
a processor, communicatively coupled to the memory, comprising:
a processing core; and
a hardware accelerator for performing AES cryptographic operation, the hardware accelerator communicatively coupled to the processing core, the hardware accelerator comprising:
a random number generator to generate a byte order indicator value, wherein the random number generator is reseeded with an intermediate value from a data register at a beginning of each encryption round of the AES cryptographic operation; and
a first switching module communicatively coupled to the random value generator, the first switching module to:
receive an input byte sequence in an encryption round of the AES cryptographic operation; and
feed a first portion of the input byte sequence, which is less than an entirety of the input byte sequence, to one of a first substitute box (S-box) module or a second S-box module based on, and in response to, the byte order indicator value generated by the random number generator.

9. The SoC of claim 8, wherein the first switching module is to feed a remaining portion of the input byte sequence to one of the first S-box module or the second S-box module based on the byte order indicator value generated by the random number generator.

10. The SoC of claim 8, wherein the one of the first S-box module or the second S-box module is associated with a $GF(2^4)^2$ composite Galois-field defined by characteristic polynomials calculated to minimize implementation area of the hardware accelerator and one of minimize or maximize a power consumption profile of the hardware accelerator.

11. The SoC of claim 8, further comprising:
a second switching module coupled to the first S-box module to restore an original order of data bytes in an output byte sequence of the first S-box module; and
a mapping module coupled to the second switching module to restore data in the output byte sequence to a common composite field representation.

12. The SoC of claim 8, further comprising:
a second switching module coupled to the second S-box module to restore original order of data bytes in an output byte sequence of the second S-box module; and
a mapping module coupled to the second switching module to restore data in the output byte sequence to a common composite field representation.

13. The SoC of claim 8, wherein in a last round of the encryption round of the AES cryptographic operation, the random value indicator generator is to feed random data to a mix columns module and at least one of the first S-box module or the second S-box module.

14. A method comprising:
receiving, by a hardware accelerator of a processor, an input byte sequence in an encryption round of a cryptographic operation;
feeding, by a switching module of the hardware accelerator, a first portion of the input byte sequence, which is less than an entirety of the input byte sequence, to one of a first substitute box (S-box) module or a second S-box module based on, and in response to, a byte order indicator value generated by a random number generator; and
reseeding, by the hardware accelerator, the random number generator with an intermediate value from a data register at a beginning of each encryption round of the cryptographic operation.

15. The method of claim 14, further comprising feeding a remaining portion of the input byte sequence to one of the first S-box module or the second S-box module based on the byte order indicator value generated by the random number generator.

16. The method of claim 14, wherein the first S-box module is associated with a $GF(2^4)^2$ composite Galois-field defined by characteristic polynomials calculated to minimize implementation area of the hardware accelerator and the second S-box module is associated with the $GF(2^4)^2$ composite Galois-field defined by characteristic polynomials calculated to minimize implementation area of the hardware accelerator.

17. The method of claim 14, further comprising restoring an original order of data bytes in an output of the first S-box module and restoring an original order of data bytes in an output of the second S-box module.

18. The method of claim 14, further comprising feeding random data to a mix columns module and at least one of the first S-box module or the second S-box module in a last round of the encryption round of the cryptographic operation.

19. A non-transitory machine-readable storage medium including instructions that, when accessed by a processing device, cause the processing device to perform operations comprising:
   receiving, by a hardware accelerator of the processing device, an input byte sequence in an encryption round of a cryptographic operation; and
   feeding, by a switching module of the hardware accelerator, a first portion of the input byte sequence, which is less than an entirety of the input byte sequence, to one of a first substitute box (S-box) module or a second S-box module based on, and in response to, a byte order indicator value generated by a random number generator; and
   reseeding, by the hardware accelerator, the random number generator with an intermediate value from a data register at a beginning of each encryption round of the cryptographic operation.

20. The non-transitory machine-readable storage medium of claim 19 further comprising feeding a remaining portion of the input byte sequence to one of the first S-box module or the second S-box module based on the byte order indicator value generated by the random number generator.

21. The non-transitory machine-readable storage medium of claim 19, wherein the first S-box module is associated with a $GF(2^4)^2$ composite Galois-field defined by characteristic polynomials calculated to minimize implementation area of the hardware accelerator and the second S-box module is associated with the $GF(2^4)^2$ composite Galois-field defined by characteristic polynomials calculated to minimize implementation area of the hardware accelerator.

22. The non-transitory machine-readable storage medium of claim 19, wherein the operations further comprising:
   restoring an original order of data bytes in an output of the first S-box module; and
   restoring an original order of data bytes in an output of the second S-box module.

23. The non-transitory machine-readable storage medium of claim 19, wherein the operations further comprising feeding random data to a mix columns module and at least one of the first S-box module or the second S-box module in a last round of the encryption round of the cryptographic operation.

* * * * *